Nov. 8, 1949 N. C. PRICE 2,487,588
VARIABLE AREA PROPULSIVE NOZZLE
MEANS FOR POWER PLANTS
Original Filed May 22, 1943
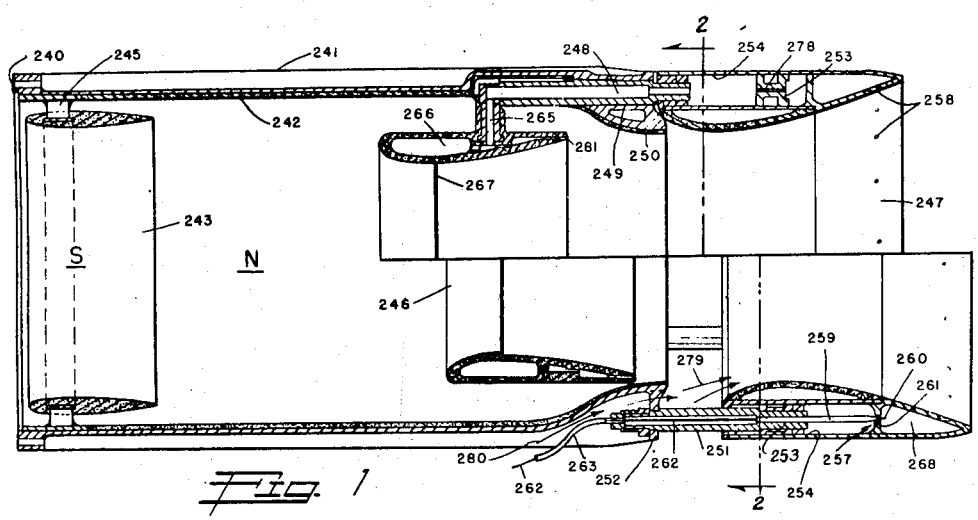
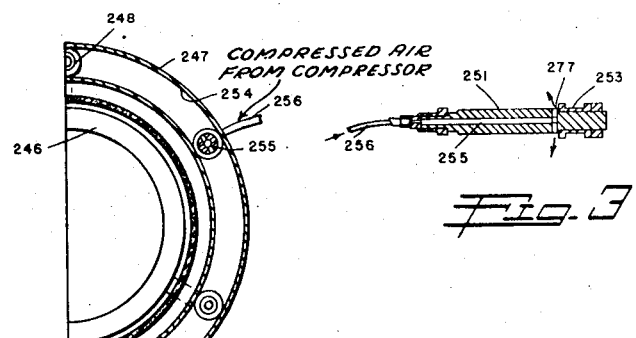
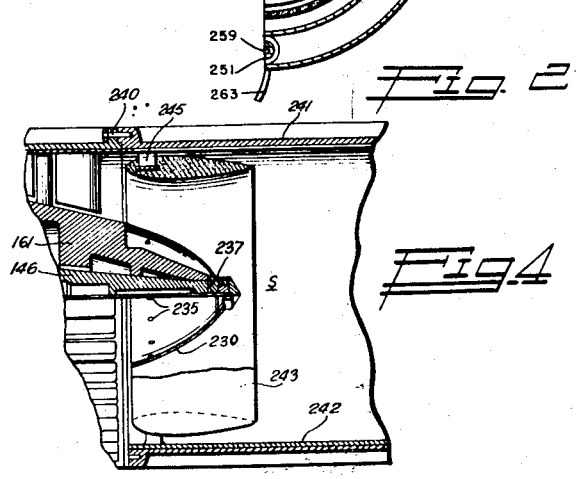
Inventor
Nathan C. Price
By George C. Sullivan
Agent Patented Nov. 8, 1949

2,487,588

UNITED STATES PATENT OFFICE 2,487,588

VARIABLE AREA PROPULSIVE NOZZLE MEANS FOR POWER PLANTS

Nathan C. Price, Los Angeles, Calif., assignor to Lockheed Aircraft Corporation, Burbank, Calif.

Original application May 22, 1943, Serial No. 488,029, now Patent No. 2,468,461, dated April 26, 1949. Divided and this application March 10, 1945, Serial No. 581,994

21 Claims. (Cl. 60—35.6)

This invention relates to prime movers and has more particular reference to nozzle constructions for internal combustion reaction type power plants. This application is a division of my copending application, Serial No. 488,029, filed May 22, 1943, now Patent No. 2,468,461, which is a continuation in part of my copending application, Serial No. 433,599, filed March 6, 1942. The present invention is intended primarily for embodiment in power plants of aircraft and other high-speed vehicles in which propulsion is produced by the reactive effect of a high velocity gas jet.

In my copending applications above identified, I have disclosed a power plant comprising, briefly, multi-stage air compressors, a combustion chamber receiving the compressed air from the compressors, a gas turbine receiving the expanding gases of combustion from the chamber and serving to drive the compressors, and a nozzle arrangement for discharging the gases from the turbine in the form of a reactive propulsive jet. The speed of operation of the gas turbine and consequently of the compressors, is dependent to a substantial extent upon the back pressures imposed on the turbine by the nozzel means, and by varying the effective area of the nozzle the speed of operation of the gas turbine and compressors may be controlled. During operation of the unit, the temperature in the secondary combustion chamber and nozzle varies, as a result of supplemental fuel injection, and the temperature in the nozzle is affected by conditions in the zone of intermediate fuel injection as influenced by the ram pressure and ambient air temperature. Such variations in the temperature at the nozzle are reflected in deviations in turbine and compressor speeds. For example, an increase in temperature of the gases passing through the nozzle is accompanied by an increase in volumetric flow which in turn increases the back pressure on the turbine. It is a general object of the present invention to provide a power plant of the class referred to embodying an efficient nozzle for discharging the combustion gases in the form of a high velocity reactive propulsive jet with means for varying both the effective length and area of the nozzle to control the speed of operation of the gas turbine and govern the general operation of the power plant as a whole. The nozzle and throat means of the invention is operable to control the back pressure on the turbine and to compensate for nozzle temperature changes to maintain or control turbine and compressor speed.

It is another object of the invention to provide a nozzle construction for gas reaction power plants characterized by novel means for varying the operative length and effective area of the nozzle. The construction includes two spaced and interconnected throat members movable with respect to a constriction in the nozzle to control the cross sectional area and the effective length of the nozzle.

It is another object of the invention to provide a nozzle of the character referred to having a sensitive remote control system for the movable throat elements embodying a cylinder and piston mechanism associated with one of the throat members. The manual control includes a valve remotely controlled by the operator or an automatic governor and serving to govern the bleeding of actuating fluid from one side of the piston, the position of the throat member being determined by the opposing frictional forces of the nozzle gases acting upon the throat members and the unbalanced fluid pressures at opposite sides of the piston. The point of equilibrium of these opposing forces is determined by the setting or position of the remotely controlled valve.

A further object of the invention is to provide a nozzle of the class above referred to having simple, yet very effective means for cooling one or both of the throat members. The actuating air under pressure supplied to the cylinder and piston means of the actuating mechanism is bled, in part, through the throat members to cool the same.

A still further object of the invention is to provide a nozzle means of the character described embodying novel internally cooled throat members of refractory material having cooling-air discharge orifices for providing boundary layers of cooling air for the surfaces of the members.

Other objectives and features of the invention will become apparent from the following detailed description throughout which reference will be made to the accompanying drawing wherein:

Figure 1 is a longitudinal detailed sectional view of the nozzle construction illustrating the throat members in their two positions;

Figure 2 is a fragmentary transverse sectional view taken substantially as indicated by line 2—2 on Figure 1;

Figure 3 is a cross sectional view of the piston and one of the supporting rods; and Figure 4 is a fragmentary sectional view of a portion of the nozzle means and adjacent portion of the turbine.

The nozzle means of the invention is adapted to be employed in association with the gas turbine of an internal combustion reaction type power plant and is operable to influence the action of the power plant as a whole. The embodiment of the invention disclosed in the drawing and herein described may be considered as an element of a power plant of the character described in my copending application, Serial No. 488,029, it being understood that the invention is capable of considerable variation to adapt it for use on reactive type power plants of different sizes, types, etc.

The nozzle structure includes a secondary combustion chamber S provided immediately at the rear of the gas turbine of the power plant and which includes an elongate cylindrical housing 241 adapted to be secured to the gas turbine housing by a bolt or screw connection 240. The tubular housing 241 is equipped with a lining 242 composed of carborundum or other suitable refractory material. An annular baffle 243 is supported within the chamber S in concentric relation to its lining 242. Circumferentially spaced streamlined struts 245 rigidly support the baffle 243 in the chamber. The baffle is constructed of refractory material or heat resistant metal and is streamlined or airfoil shaped in longitudinal cross section. The streamlined baffle 243 is in spaced surrounding relation to the cap 230 of the turbine rotor and is therefore in surrounding relation to the annular series of supplementary fuel orifices 235. Supplemental fuel is supplied to the hollow shaft 146 of the turbine rotor 161 and passes through orifices 237 in the cap 230 to discharge from the orifices 235. The secondary combustion chamber equipped with the airfoil shaped baffle 243, utilizes the kinetic energy of the residual velocity of the gas issuing from the gas turbine, to render this energy additive to the kinetic energy of the propulsive jet. It will be observed that the baffle protects the housing 241 in the area of introduction of the supplementary fuel and being spaced from the lining 242 leaves an annular passage for carrying relatively cool gases which form a boundary layer along the surface of the lining, thus further protecting the housing.

The nozzle N includes the above described tubular housing 241 and its lining 242, the housing and lining extending rearwardly a considerable distance beyond the secondary combustion chamber. The rear portion of the housing 241 is shaped to have an internal contraction or throat restriction 250. The refractory lining 242 continues over the surface of the throat constriction to protect the same. The nozzle means further includes axially spaced tubular throat members 246 and 247. The member 246 is within the housing 241 at the upstream side of the throat constriction, and is streamlined or airfoil shaped in longitudinal cross section. The throat member 247 is at or beyond the rear end of the constriction 250 and presents a cambered or curved convex inner surface. The minimum diameter of this curved surface is substantially the same as the minimum effective diameter of the constriction 250. As shown in Figure 1, the exterior of the throat member 246 may be substantially cylindrical, while the inner surface is cambered and has an effective diameter shorter than the effective diameter of the throat restriction 250. The throat members are formed of or protected by refractory material or heat resistant metal and are hollow for cooling purposes as will be later described.

The longitudinally spaced throat members are supported for axial movement and are connected for movement in unison. A plurality of circumferentially spaced longitudinally extending hollow rods 248 connect the throat members 246 and 247, and slidably operate in longitudinal bearing channels 249 in the throat portion 250 of the housing 241. The outer throat member 247 is also slidably supported and guided on spaced hollow piston rods 251. The forward ends of the piston rods 251 are fixed to fittings 252 on the rear end of the nozzle housing 241. The rear portions of the piston rods 251 extend into a tubular cylinder 254 arranged or formed within the hollow throat member, and the rods are fixed to an annular piston 253 within the cylinder. It will be seen that the throat member 247 and its cylinder 254 are reciprocable relative to the fixed piston 253.

The interconnected throat members 246 and 247 are movable axially to vary the length and effective area of the nozzle and the invention provides a remotely controllable fluid pressure actuated system for determining the positions of the members. This system includes a longitudinal passage 255 in at least one of the piston rods 251 extending from the forward end of the rod to lateral ports 277 which communicate with the annular cylinder 254 at the rod side of the piston 253. Figure 3 illustrates this construction. A pipe or tube 256 conducts air under substantially constant pressure to the passage 255 for delivery to the rod end of the cylinder. The tubing 256 is supplied with the air under pressure from a selected stage of the air compressor, or from another suitable pressure source.

The control system for governing or determining the longitudinal position of the throat members 246 and 247 includes provision for supplying air under pressure to the rear side of the piston 253 to balance, or partially balance, the pressure at the forward side of the piston. In the preferred construction, this means comprises a duct 278 of relatively small capacity extending longitudinally through the piston to connect the forward and rearward ends of the cylinder 254. The control system further includes a remotely operable valve for controlling the bleeding of air from the rear end of the annular cylinder 254. The rear portion of the throat member 247 has an internal cavity 268 vented to the atmosphere by a series of spaced orifices 258 in the inner wall of the member adjacent its rear end. The control valve is in the nature of a needle valve 257 comprising a stem 259 having a needle point 260 for cooperating with a beveled seat 261. The seat 261 surrounds an opening which connects the rear end of the cylinder 254 with the cavity 268. The valve stem 259 extends through one of the piston rods 251 and a flexible control wire 262 is connected with its forward end. The wire 262 may extend to a remote conveniently accessible operating or adjusting lever, or the like, not shown, and may be protected by a flexible protective housing 263. It will be seen that the position of the valve head or needle 260 may be readily altered by simple operation of the control wire.

The invention provides means for cooling the inner throat member 246 of the nozzle. The hollow connecting rods 248 communicate with the forward end of the annular cylinder 254 and ducts 265 lead from the forward ends of the hollow rods to the interior of the throat member 246. A row of circumferentially spaced orifices 267 is provided in the inner wall of the member 246. A row of similar orifices 281 is formed in the trailing edge of the member 246. A portion of the air under pressure supplied to the cylinder 254 is bled into the throat member 246 and flows therethrough to exhaust from the series of orifices 267 and 281. The airflow through the throat member 246 serves to cool the same, and the air discharged from the orifices forms a protective boundary for the surfaces of the member and provides a boundary layer control action to increase the efficiency of the nozzle. It will be observed that the airflow through the annular cylinder 254 and the annular cavity 268 likewise cools the outer throat member 247.

Referring now primarily to Figure 1, the variable area propulsive nozzle operation is as follows: The upper half of the figure shows the throat members 246 and 247 in a fully retracted position to form a nozzle opening of maximum effective opening area and the lower half of the figure shows the throat members 246 and 247 in a fully extended position to form a nozzle opening of minimum effective opening area.

In general, the positions of the throat members are varied between the extreme retracted and extended positions illustrated, for the purpose of correspondingly varying the turbine exhaust back pressure and the attendant turbine speed. The position of the throat members is determined by the position of the stem 259 of the needle valve 257 with respect to the piston rod 251 and may be controlled through the Bowden type of flexible wire control cable 262 which leads through the flexible housing 263 to a suitable manual or remote adjusting device not shown. Air under substantially constant pressure is supplied from a suitable source to the inner or rod end of the annular cylinder 254 contained within the outer throat member 247, by way of a tube 256 which makes connection to an exposed end of one of the several hollow piston rods 251 as best shown in Figure 3 upon which the outer throat member 247 is slidably supported. Air reaches the cylinder from pipe 256 through the central bore 255 in the piston rod and through the lateral ports 277. The duct 278 bleeds sufficient air from the rod end of the cylinder to the head end of the cylinder to partially equalize the pressure on either side of the piston 253. The frictional forces of the gases flowing out of the nozzle tend to carry the throat members out to the extended position. Such motion causes the needle valve to open, which allows the air pressure to drop in the head end of the annular cylinder 254 and the resulting overbalancing pressure in the rod end of the cylinder then acts to check the outward motion of the said throat members. The throat members 246 and 247 thus take a position at which equilibrium is reached between the opposing frictional forces of the nozzle gases acting on the throat members and the unbalance of air pressure acting on the annular piston 253. The point at which such equilibrium is reached is determined by the axial position of the needle valve point 260 relative to the rod 251 and the nozzle housing.

When the nozzle throat members are in the extended position, air from the space surrounding the nozzle is drawn through the opening formed between the end of the nozzle body 250 and the outer throat member 247 to co-mingle with the jet of combustion gases as illustrated by the arrows 279 and 280 and an augmenter action is obtained.

A portion of the compressed air introduced into the rod end of the annular cylinder 254 is allowed to flow through passageways in one or more of the tie rods 248 into the interior cavity 266 of the inner throat member 246 for cooling purposes. The cooling air thus introduced into the throat member is allowed to escape through a plurality of inwardly directed apertures 267 located at the throat member and also through a plurality of apertures 281 in the trailing edge of the throat member. In addition to the cooling of the nozzle parts, the air escaping from the apertures 267 and 281, and also at 258, tends to effect boundary layer control within the nozzle elements favorable to increased nozzle efficiency.

Having described only a typical form of the invention, I do not wish to be limited to the specific details herein set forth, but wish to reserve to myself any variations or modifications that may appear to those skilled in the art or fall within the scope of the following claims.

I claim:

1. Nozzle means for the exhaust of a propulsive unit, comprising a nozzle for communicating with the exhaust of said unit, a contraction in said nozzle forming a passage of reduced cross sectional area, a first annular shaped throat member coaxially positioned within said nozzle intermediate the exhaust of said unit and the said contraction, a second annular shaped throat member coaxially positioned outside of and adjacent the outer end of said nozzle, means coupling said first and second annular throat members together for simultaneous longitudinal motion with respect to the axis of said nozzle and said contraction in said nozzle whereby the effective length and cross sectional area of the throat of said nozzle may be varied, and means to impart longitudinal movement to said throat members.

2. Nozzle means for the exhaust of a propulsive unit, comprising a nozzle for communicating with the exhaust of said unit, a contraction in said nozzle forming a passage of reduced cross sectional area, a first annular shaped throat member coaxially positioned within said nozzle intermediate the exhaust of said unit and the said contraction, a second annular shaped throat member coaxially positioned outside of and adjacent the outer end of said nozzle, means coupling said first and second annular throat members together for simultaneous longitudinal motion with respect to the axis of said nozzle whereby the effective length and cross sectional area of said nozzle may be varied, a cylinder contained in said second annular shaped throat member, a piston in said cylinder, a coupling between said piston and said nozzle, means to introduce fluid under pressure into said cylinder and means to vary the pressure of said fluid in said cylinder to move and position said annular throat members with respect to said nozzle.

3. Apparatus according to claim 1 in which the said annulus of the throat members have inwardly cambered streamline cross sections forming in effect a variable venturi shaped nozzle opening.

4. Apparatus according to claim 2 in which the said annulus of the throat members have inwardly cambered streamline cross sections forming, in effect, a variable venturi shaped nozzle opening.

5. Nozzle means for the exhaust of a propulsive unit, comprising a nozzle for communicating with the exhaust of said unit, a contraction in said nozzle forming a passage of reduced cross sectional area, a first annular shaped throat member coaxially positioned within said nozzle intermediate said exhaust and said contraction, a second annular shaped throat member coaxially positioned outside of and adjacent the outer end of said nozzle, means coupling said first and second annular throat members together for simultaneous longitudinal motion with respect to the axis of said nozzle whereby the effective length and cross sectional area of said nozzle may be varied, a cylinder contained in said second annular shaped throat member, a piston in said cylinder, a coupling between said piston and said nozzle, means to introduce fluid under pressure into said cylinder and follow-up valve means to vary the pressure of said fluid in said cylinder in accordance with a function of the longitudinal position of said annular throat members with respect to said nozzle.

6. Apparatus according to claim 1 with cooling ducts in at least one of said throat members and means to pass cooling fluid through said duct.

7. Nozzle means for a reactive propulsion unit having an exhaust comprising a nozzle communicating with the exhaust of the unit, a hollow tubular throat member movable axially with respect to the nozzle to vary the effective area thereof, the hollow throat member having ports leading from its interior to its external surface where they communicate with the interior of the nozzle, fluid pressure actuated means for moving the throat member, a remote control for the fluid pressure actuated means, and means for circulating coolant through the hollow member for discharge from said ports.

8. Nozzle means for the exhaust of a reactive propulsion unit comprising a nozzle communicating with said exhaust, a throat member movable axially relative to the nozzle to vary the effective area thereof, and a control for the throat member including a cylinder and piston for moving the member, means for supplying actuating fluid under a substantially constant pressure to the cylinder, valve means for unbalancing the pressures at the opposite sides of the piston whereby said unbalanced pressures tend to move the member in one direction, the friction of the nozzle gases tending to move the member in the other direction, and means for changing the setting of the valve means whereby said unbalanced pressures and said friction will be in equilibrium with the member in selected axial positions.

9. Nozzle means for the exhaust of reactive propulsion unit comprising a nozzle for communicating with said exhaust, throat means for varying the effective area of the nozzle comprising a member movable axially with respect to the nozzle and through which the nozzle gases pass, a cylinder and piston for moving the member axially, means for conducting fluid under substantially constant pressure to the cylinder, a valve for unbalancing the pressures at opposite sides of the piston and adjustable to vary such unbalancing of pressures, the unbalanced pressures tending to move the member in one direction and the friction of the nozzle gases tending to move the member in the other direction, and remotely controlled means for changing the position of the valve so that said unbalanced pressures and said friction come into equilibrium with the member in any selected axial position.

10. Nozzle means for the exhaust of a gas reactive propulsion unit comprising a nozzle communicating with the exhaust of the unit, throat means for varying the effective area of the nozzle comprising a member movable axially with respect to the nozzle and through which the nozzle gases pass, a cylinder carried by the member, a relatively stationary piston in the cylinder, means for conducting fluid pressure to the opposite ends of the cylinder, there being an orifice for bleeding pressure from one end of the cylinder so that pressures on the opposite sides of the piston are unbalanced to move the member in one direction, a valve for controlling said orifice and movable with respect thereto cause unbalancing of the pressures with the member in selected axial positions, the friction of the gases tending to move the member in the other direction, and means for moving the valve so that said friction and said unbalanced pressures will come into equilibrium when the member is positioned as determined by the setting of the valve.

11. Nozzle means for the exhaust of a reactive gas propulsion unit comprising a nozzle for communicating with the exhaust of the unit, a throat restriction on the wall of the nozzle, a tubular open ended throat member at a side of the restriction, means supporting the member for movement axially relative to the restriction to vary the effective area of the nozzle, the member having a divergent internal throat surface substantially axially aligned with the internal surface of said restriction, and means for moving the member.

12. Nozzle means for the exhaust of a reactive gas propulsion unit comprising a nozzle for communicating with the exhaust of the unit, a throat restriction in the nozzle having a passage of minimum cross sectional area at the discharge end of the nozzle, a tubular throat member having an internal surface substantially axially aligned with the internal wall of said throat restriction, means supporting the member for movement from a position with its forward end at said discharge end of the nozzle so as to constitute a rearward continuation of said restriction to a position where said member is spaced rearwardly of said end of the nozzle, and means for moving said member.

13. Nozzle means for the exhaust of a reactive gas propulsion unit comprising a nozzle for communicating with the exhaust of the unit, a throat restriction in the nozzle, said restriction reducing the effective cross sectional area of the nozzle to the greatest extent at the discharge end of the nozzle, a tubular throat member having an internal surface substantially axially aligned with the internal wall of said throat restriction, means supporting the member for movement from a position with its forward end at said discharge end of the nozzle so as to constitute a rearward continuation of said restriction to a position where it is spaced rearwardly of said end of the nozzle, means for circulating coolant through the member, and means for moving said member.

14. Nozzle means for the exhaust of a reactive gas propulsion unit comprising a nozzle for communicating with the exhaust of the unit, a throat restriction in the nozzle, said restriction being adjacent the discharge end of the nozzle, a tubular throat member, means supporting the member for movement from a position where it forms a rearward continuation of said restriction to a position where it is spaced rearwardly of said end of the nozzle, the member having an internal cavity and orifices leading from the cavity through the internal wall of the member, means for circulating cooling air through the cavity for discharge from the orifices, and means for moving said member.

15. Nozzle means for the exhaust of a reactive gas propulsion unit comprising a nozzle for communicating with the exhaust of the unit, a throat restriction in the nozzle, a throat member at each side of the restriction, means supporting the members for movement in unison axially relative to the restriction to vary the effective area of the nozzle, means for circulating coolant through the members, and means for moving the members.

16. Nozzle means for the exhaust of a reactive gas propulsion unit comprising a nozzle for communicating with the exhaust of the unit, a throat restriction in the nozzle, a throat member at each side of the restriction, means supporting the members for movement in unison axially relative to the restriction to vary the effective area of the nozzle, cylinder and piston means for moving the members, means for supplying actuating air under pressure to the cylinder and piston means, the members having internal cavities, and means for bleeding a portion of said air under pressure into the cavities to cool the members.

17. Nozzle means for the exhaust of a reactive gas propulsion unit comprising a nozzle for communicating with the exhaust of the unit, a throat restriction in the nozzle, a hollow tubular throat member supported for movement toward and away from said restriction, the member having orifices in its inner wall, cylinder and piston means for moving the member, means for supplying actuating air under pressure to the cylinder and piston means, and means for bleeding a portion of the air under pressure into the interior of the hollow member for discharge from said orifices.

18. Nozzle means for the exhaust of a reactive gas propulsion unit comprising a nozzle for communicating with the exhaust of the turbine, a throat restriction in the nozzle, a hollow tubular throat member supported for movement toward and away from said restriction, the member having orifices in its inner wall, cylinder and piston means for moving the member, means for supplying actuating air under pressure to the cylinder and piston means, and means for bleeding a portion of the air under pressure into the interior of the hollow member for discharge from said orifices, said orifices being directed rearwardly so that the air discharged therefrom forms a boundary layer on the inner surface of the tubular member.

19. Nozzle structure for the exhaust of a reactive gas propulsion unit comprising a tubular nozzle for communicating with the exhaust, a throat restriction in the nozzle adjacent the discharge end of the same, a tubular throat member in the nozzle in upstream relation to the restriction having an effective internal diameter smaller than the effective diameter of the restriction, a tubular throat member in downstream relation to the restriction and having an effective internal diameter slightly larger than that of the restriction, means supporting the throat members for axial movement relative to the restriction, and means for imparting such movement to the members.

20. Nozzle means for discharging gases in the form of a propulsive jet comprising a tubular nozzle for the discharge of said gases, a restriction at the discharge end of the nozzle, an axially movable tubular open ended member of airfoil cross section extending rearwardly beyond the restriction to form an extension of the nozzle; and fluid pressure actuated means for moving the member and operable to move the member rearwardly from the restriction to leave a passage through which air is induced to flow so as to enter said member by the ejector effect of the gases discharging through said member, the minimum internal diameter of said member being substantially the same as the minimum internal diameter of said restriction.

21. Nozzle structure for the exhaust of a reactive gas propulsion unit comprising a tubular nozzle for communicating with the exhaust, a throat restriction in the nozzle adjacent the discharge end of the same, a tubular throat member through which the gases pass, means for supporting the member for axial movement relative to the restriction including movable support means spaced radially from the member, arms extending radially from the member to support means, the arms including tubular metal cores, and refractory material shields on the cores, and means for circulating coolant through the cores.

NATHAN C. PRICE.

REFERENCES CITED

The following references are of record in the file of this patent:

UNITED STATES PATENTS

| Number | Name | Date |
| --- | --- | --- |
| 607,548 | Pinkert | July 19, 1898 |
| 658,586 | Reiling | Sept. 25, 1900 |
| 1,422,582 | Leblanc | July 11, 1922 |
| 1,493,157 | Mélot | May 6, 1924 |
| 1,555,030 | Schmidt | Sept. 29, 1925 |
| 2,346,178 | Mercier | Apr. 11, 1944 |
| 2,356,557 | Anxionnaz et al. | Aug. 22, 1944 |
| 2,390,161 | Mercier | Dec. 4, 1945 |

FOREIGN PATENTS

| Number | Country | Date |
| --- | --- | --- |
| 310,926 | Germany | Feb. 8, 1919 |
| 483,888 | Germany | Oct. 7, 1929 |